March 6, 1928.

J. MA RIOJAS

WHEEL AND TIRE THEREFOR

Filed Nov. 9, 1926

Jose Ma Riojas, Inventor

Witnesses
C. E. Churchman Jr.

By Richard B. Owen

Attorney

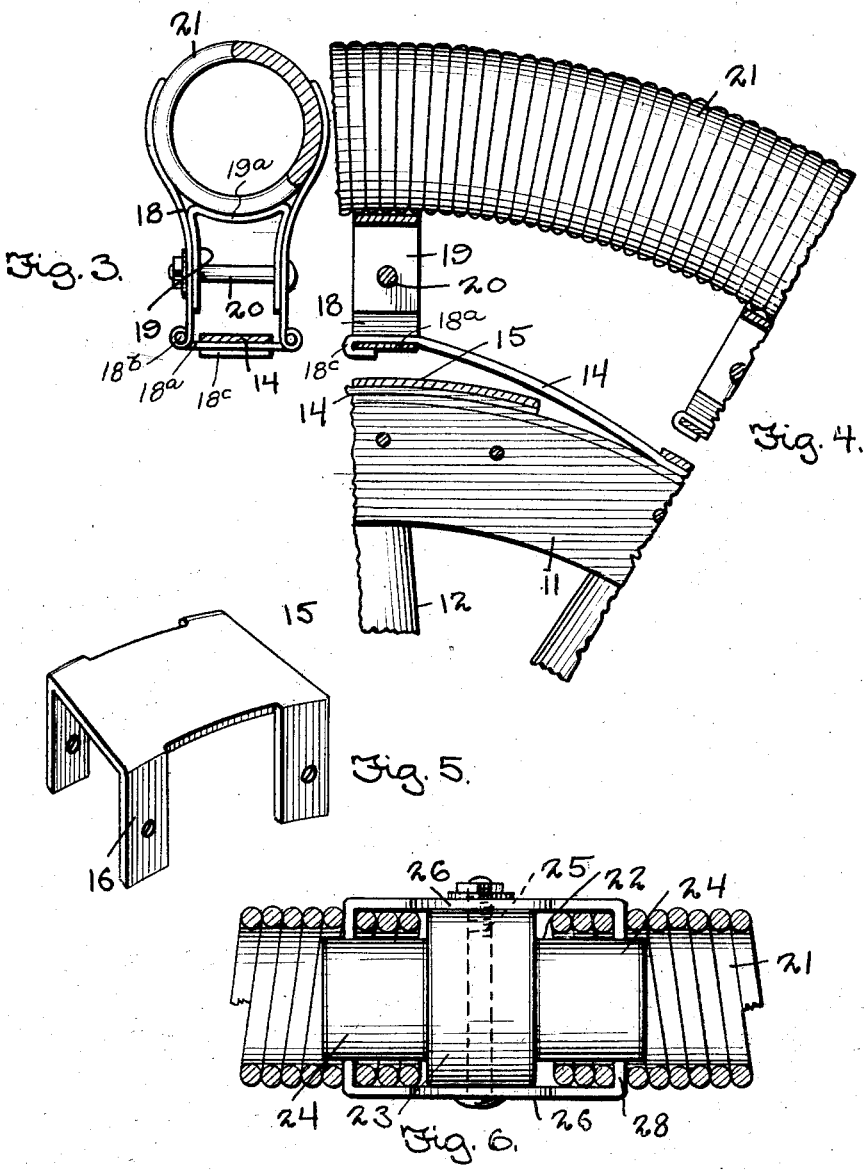

Patented Mar. 6, 1928.

1,661,502

UNITED STATES PATENT OFFICE.

JOSÉ MA RIOJAS, OF EAGLE PASS, TEXAS.

WHEEL AND TIRE THEREFOR.

Application filed November 9, 1926. Serial No. 147,223.

This invention relates to improvements in vehicle wheel construction and has for its primary object to provide a novel construction of resilient automobile wheel.

A further object of the invention is the provision of a vehicle wheel which will effectually cushion the shocks imparted to the wheel and at the same time obviate the usual tire trouble incident to air leakage or puncture.

A still further object of the invention is the provision of a vehicle wheel which is durable, simple of construction, capable of convenient assembly and which will be efficient in use.

Still another object of the invention is the provision of a vehicle wheel having a resilient outer tire capable of convenient replacement and which may be manufactured at a comparatively low cost.

Other objects and advantages of the invention will become apparent as the description progresses.

In the accompanying drawings forming a part of this application and in which like reference characters are employed to designate corresponding parts of the same:

Figure 3 is an enlarged transverse sectional view taken on the line 3—3 of Figure 1.

Figure 4 is an enlarged fragmentary sectional view taken in the median plane of the wheel, Figure 5 is a perspective view of a holding plate, and Figure 6 is an enlarged transverse sectional view taken on the line 6—6 of Figure 1.

Figure 1:
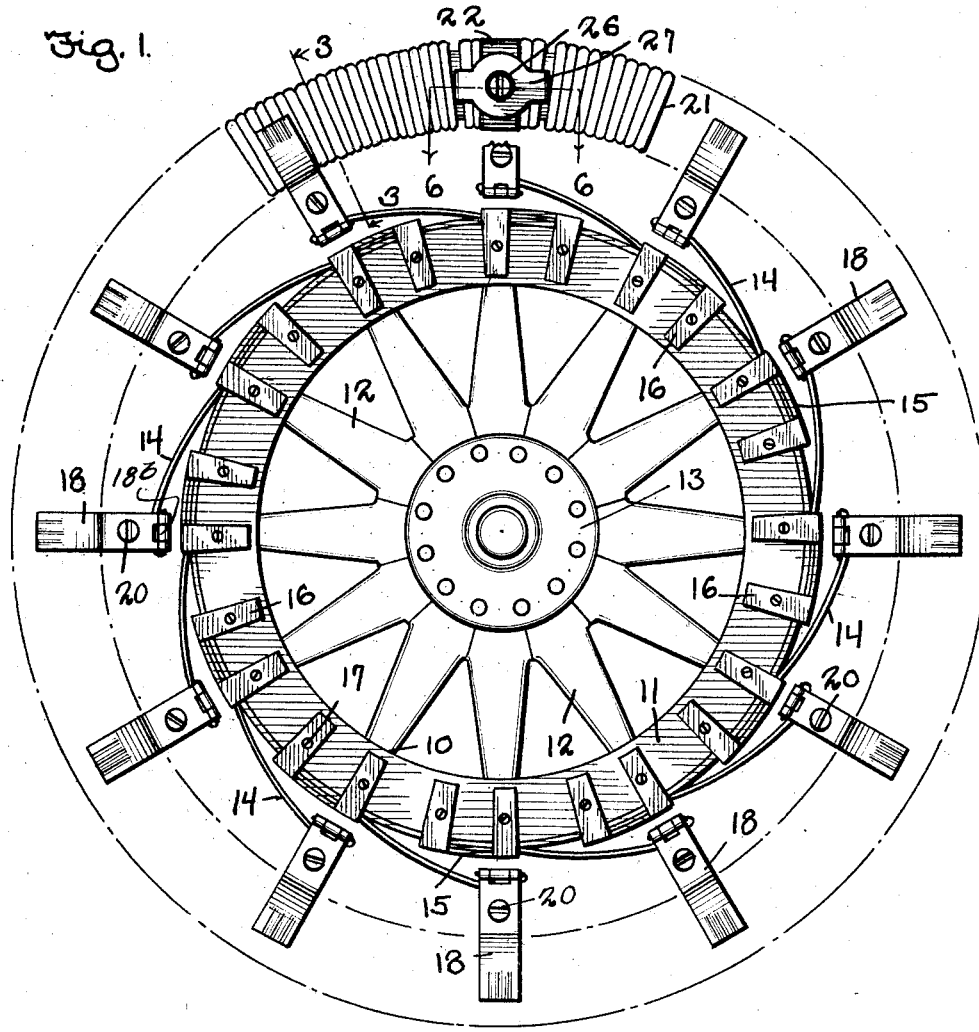
Figure 1 is a side elevational view of a wheel constructed in accordance with my invention.

Referring to the drawings, the numeral 10 generally designates the rim structure comprising an annular rim or felly 11 of rectangular cross section preferably formed of wood. This rim supports, as usual, a plurality of spokes 12 which radiate from a central hub 13.

An essential characteristic of my invention resides in the provision of a plurality of substantially tangential springs 14 each having one end secured to the periphery of the rim 11, the springs being outwardly curved from their said ends. The said ends of the springs are rigidly secured to the rim 11 by means of clamping plates 15 each comprising a substantially rectangular body provided with right angularly projecting lugs 16. The said end portion of each spring which is placed in contact with the rim is secured in position by means of the respective clamping plate 15 which is positioned over the said end of the spring with the lugs 16 fitting against the sides of the rim. The lugs 16 are apertured to receive suitable securing screws 17 by means of which the clamping plates are held in position.

The tire of the wheel, which tire will presently be specifically described, is supported by means of brackets which are mounted upon the outer ends of the springs 14. Each of these brackets comprises a base plate 18ª and bracket arms 18 which are hingedly connected at their inner ends, as at 18ᵇ, to the opposite ends of the base plate 18ª. In mounting the brackets upon the outer ends of the springs 14, the base plates 18ª of the brackets are disposed against the inner sides of the respective springs 14 near the outer ends thereof, and the end portions of the springs are overturned upon themselves as at 18ᶜ so as to engage over one edge of the respective base plate 18ª, this portion of each spring being secured to the respective base plate 18ª in any suitable manner as, for example, by rivets or by welding. The arms 18 of each bracket are outwardly curved at their outer portions on the arcs of a circle, so as to embrace the sides of the tire, which will presently be described. In order that the tire may be properly supported between the said outer portions of the arms 18 of the brackets, and likewise in order that the arms of the brackets may be held rigid with respect to each other, a combined spacing and tire supporting member is interposed between the arms of each bracket and comprises spaced side portions 19 and a longitudinally curved connecting and seating portion 19ª, the portions 19 of the said member being disposed against the inner sides of the inner portions of the arms 18. The said combined spacing and supporting member is preferably formed of resilient bar metal, and bolts 20 are secured through the portions of the arms 18 of the brackets, which portions are engaged by the side members 19 of the said spacing and supporting members, and likewise through the said portions 19, tightening of the nuts upon the bolts serving to firmly clamp the said portions of the arms 19 against the opposite sides of the spacing and supporting members and thus maintain the arms 18 in proper spaced relation and in proper engagement with the tire.

Figure 2:
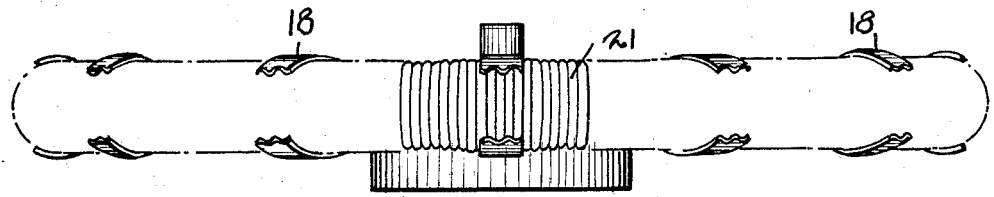
Figure 2 is a bottom plan view of the same.

The tire, heretofore referred to, comprises an annular resilient body 21 which is preferably in the form of a closed coil of uniform diameter, the ends of which coil are connected in a manner to be presently described, the tire being disposed between the curved outer portions of the bracket arms 18 in the manner most clearly shown in Figs. 1, 2 and 3 of the drawings and the opposite sides of the tire being, as previously stated, embraced by these portions of said arms 18.

A yieldable tire 21 is designed to be fitted in the outer portions of the brackets in a concentric position about the base wheel. This tire is preferably formed of a spiral metallic rod of resilient construction so as to provide a comparatively strong resilient structure. This tire may be of unitary construction and the ends thereof connected by means of a detachable connection.

The connection for the ends of the tire body preferably comprises a coupling 22 comprising a cylindrical body 23 of approximately the same diameter as the tire body and having reduced end portions 24 also of cylindrical formation adapted to fit into the ends of the tire body. The body of the coupling is provided with a transverse bore through which is fitted a bolt 25. Disposed against the opposite sides of the body 23, in parallel relation to each other are a pair of coupling plates 26, preferably of circular formation and provided with central openings through which the ends of the bolt 25 are fitted, the plates having outwardly extending arms 27 bent at their outer ends to provide right angular inwardly extending lugs 28. As clearly shown in Figures 1 and 6, the ends of the tire body 21 are fitted over the end portions 24 of the coupling and the coupling plates 26 are secured to the body of the coupling with the lugs 28 projecting in engagement between the coils of the tire body near the ends of said body and thus connecting said ends. Thus, the coupling will securely maintain the tire in concentric relation to the wheel hub and is designed for convenient disconnection when replacement or repair of the tire becomes necessary.

In use, when the tire meets with an inequality in the road surface the shock will be absorbed by the spring 14, the shock being uniformly distributed about the periphery of the wheel so as to produce a cushion effect more effective than that of the standard pneumatic tire. A further advantage is the durability of the present construction, obviating the troubles incident to puncture and similar tire trouble. In this connection it will be noted, that the outer resilient tire may be conveniently replaced without difficulty and at a very moderate cost.

It is to be understood that the form of my invention herewith shown and described is to be taken as the preferred example of the same, and that various changes as to the shape, size and arrangement of parts may be resorted to without departing from the spirit of the invention or the scope of the subjoined claims.

Having thus described my invention, I claim:

1. A resilient wheel comprising a solid rim, spring arms secured to the periphery of the rim and extending substantially tangentially with respect thereto, tire supporting brackets mounted upon said springs and each comprising a base member secured to the respective springs and arms extending from the base member and having longitudinally curved outer portions, a resilient tire body disposed between and embraced at its sides by the said portions of the arms, and means for holding said arms in clamping engagement with said tire body.

2. A resilient wheel comprising a solid rim, spring arms secured to the periphery of the rim and extending substantially tangentially with respect thereto, tire-supporting brackets mounted upon said springs and comprising a base member secured to the outer ends of the respective springs and arms pivotally connected to the base member and extending therefrom and having longitudinally curved outer portions, a resilient tire body disposed between and embraced at its sides by the said portions of the arms, and means for holding said arms in clamping engagement with said tire body.

3. A resilient wheel comprising a solid rim, spring arms secured to the periphery of the rim and extending substantially tangentially with respect thereto, tire-supporting brackets mounted upon said springs and each comprising a base member secured to the outer ends of the respective springs, and arms extending from the base member in an outward direction and having longitudinally curved outer portions, a resilient tire body disposed between and embraced at its sides by the curved portions of the arms, a resilient spacing and supporting member interposed between said arms and comprising spaced portions engaged with the inner sides of the arms and a connecting intermediate portion longitudinally curved and engaging and seating the inner side of the tire body, and bolts secured through the arms and through the side portions of the spacing and supporting members.

4. In a resilient wheel, a tire comprising an annular body in the form of a closed resilient coil, and means separably connecting the ends of the coil and including a member disposed between the said ends of the coil, and other members mounted upon the first member, and having lugs engaging between the windings of the coil.

5. In a resilient wheel, a tire comprising a resilient body in the form of a closed coil, and means separably connecting the ends of the body and comprising a member interposed between said ends and having portions to which the said ends are fitted, and other members secured to opposite sides of the first mentioned member and having inwardly projecting lugs engaging between the coils of the tire body near the said ends thereof.

In testimony whereof I affix my signature.

JOSÉ MA RIOJAS.